US006191956B1

(12) United States Patent
Foreman

(10) Patent No.: US 6,191,956 B1
(45) Date of Patent: Feb. 20, 2001

(54) CIRCUIT FOR GENERATING HIGH VOLTAGE TO IGNITE OIL OR GAS OR OPERATIVE NEON TUBES

(75) Inventor: Donald S. Foreman, Fridley, MN (US)

(73) Assignee: Honeywell International Inc., Morristown, NJ (US)

( * ) Notice: Under 35 U.S.C. 154(b), the term of this patent shall be extended for 0 days.

(21) Appl. No.: 09/405,811

(22) Filed: Sep. 24, 1999

(51) Int. Cl.[7] .................................................. H02M 3/335
(52) U.S. Cl. ............................ 363/16; 315/219; 363/19
(58) Field of Search .................................. 363/19, 16, 34; 315/219, 227, 291

(56) References Cited

U.S. PATENT DOCUMENTS 4,232,252 * 11/1980 Peil ........................................ 315/92
5,747,942 * 5/1998 Ranganath ........................... 315/224

* cited by examiner

Primary Examiner—Shawn Riley
(74) Attorney, Agent, or Firm—Robert B. Leonard

(57) ABSTRACT

A solid state power supply circuit for providing high frequency power to ignite oil or gas and operate neon sign transformers. A switch operates in conjunction with a resonant tank circuit to supply power to the resonant tank at a predetermined time. The timing of the pulse is controlled to occur when the operation of the transistor will result in providing maximum energy to the load while minimizing power dissipation in the transistor. An amplifier and clamping circuit also operate to limit the duration of the pulse to further reduce power dissipation in the switch.

15 Claims, 5 Drawing Sheets

CIRCUIT FOR GENERATING HIGH VOLTAGE TO IGNITE OIL OR GAS OR OPERATIVE NEON TUBES

FIELD OF THE INVENTION

The present invention relates generally to a power supply apparatus for providing efficient high frequency power to a transformer. More specifically, the present invention relates to a power supply designed to minimize dissipation while providing power to a high frequency transformer by providing that the power supplied to a resonant tank circuit driving the transformer is timed to occur when the drive pulse to the resonant tank will result in providing maximum energy to the load and minimum dissipation in the circuit.

BACKGROUND OF THE PRIOR ART

An oil burner typically consists of a fan that blows air past a nozzle spraying oil under pressure. The oil-air mixture is ignited by placing arcing electrodes slightly upstream of the oil spray and using the high velocity air from the fan to blow the hot gas from the arc into the oil spray. The heat from the gas causes combustion of the oil-air mixture. In these oil burners, the voltage needed to provide the appropriate arc is typically between five to ten thousand volts or more. In previous oil burners, such high voltages were normally produced with a low frequency, step-up transformer connected to a standard 60 Hz power line. However, due to the core requirements of power transformers designed to operate at such low frequencies, these transformers were large, heavy, and expensive.

Additionally, gas discharge devices such as those for neon signs, as well as discharge ignition gas burner systems such as those used in furnaces, also require a high voltage for operation. These devices have also used expensive, heavy, low frequency step-up transformers to provide the high voltage from a 60 Hz power line.

Similarly, natural gas and liquefied propane (LP), hereinafter both referred to as "gas," are commonly ignited in gas appliances either by a standing pilot flame, an electric spark, or a hot-surface ignitor. Each of these ignition methods may not be preferable since standing pilot flames waste gas, hot-surface ignitors are expensive and fragile, and spark ignition is typically noisy. In previous spark ignitors, the snapping noise made during operation may be objectionable to some users. There are also several disadvantages in operating transformers for oil burners at low frequencies, such as 60 Hz. In the formation of the arc, the moving air surrounding the electrodes carries away the ions from between the electrodes. This has the same effect as lengthening the air gap between the electrodes. As a result of this constructive increase in length, there is a gradual increase in the voltage needed to hold the arc. At some point, the ionized path becomes so extended that the holding voltage exceeds the voltage at which an ionized path is created; this is known as the breakdown voltage. When this happens, a new arc is formed and the fan out process begins again. Below about 400 Hz, the electrodes retain the same polarity from the start of an arc until the next arc begins. Above 400 Hz, the voltage changes polarity and the arc current goes to zero while the holding voltage is less than the breakdown voltage. With no arc current, the ionized path begins to dissipate. The electrode voltage must now form the ionized path again before the current can flow. If only a short period passes after the current stops flowing, the voltage required to re-establish the arc through the old path, the restrike voltage, is only slightly greater than the holding voltage.

Consequently, much smaller, lighter, and less expensive transformers may be used to realize the power requirements if powered by a higher operating frequency. Thus, solid state power supplies have been developed to provide this higher operating frequency. As frequencies less than around 10 kilohertz are generally audible and annoying to their owners, transformers which operate at frequencies above 25 kilohertz are generally preferred.

Solid state power supplies used to provide the high frequency voltage to the transformers have been used in a variety of applications. Such known designs, however, have not been of satisfactory cost or efficiency. Since the lifetime of electronic equipment is shortened at elevated operational temperature, the risk of failure increases both as a function of time and as a function of temperature. Similarly, the lifetime of nearby equipment may be shortened if they surround components operating at an elevated temperature. The need then exists for a low cost, cool running, solid state power supply for an oil, gas, and neon sign ignitor.

For comparison, U.S. Pat. No. 4,698,741 (Pacholok) depicts a solid state power supply with a free-running oscillator to generate a high frequency power signal. The oscillator uses an arrangement of transistors such that a high-speed switching transistor rapidly deactivates a high voltage transistor. Although this provides a high frequency signal, the circuit results in dissipation of a significant amount of power in the switching transistor, which necessitates a heatsink. Because of the high temperatures at which this switching transistor runs, the lives of the transistor and nearby electrical components are potentially shortened. The switching transistor in this circuit is also significantly overdriven under "no load" conditions, resulting in peak voltages in the tank circuit becoming excessive. Consequently, the transistors used must be rated for 600 to 800 volts, even for operation on U.S. domestic 120 volt power, and the insulation of the transformer must be designed to withstand these extremes.

SUMMARY OF THE INVENTION

To overcome the problems of excessive voltages and significant power dissipation in the switching transistor, the present invention utilizes a novel arrangement whereby a parallel-resonant circuit operates with a clamping apparatus to control a single switching transistor, which also operates to minimize the power dissipation in the transistor.

The improved solid state power supply includes a current sensing circuit, designed to operate in conjunction with a resonant tank circuit for detecting the appropriate time to supply power to the switching transistor. An amplifier then amplifies the current waveform existing in the resonant tank circuit and passes this amplified waveform to a clamping circuit. The clamping circuit operates to provide to or remove power from the switching transistor. The timing of the power supplied is controlled to occur at times when the operation of the transistor will result in providing maximum energy to the load and minimum power dissipation in the transistor. This event occurs around the time when the voltage at the juncture between the resonant tank circuit and the switching transistor is at a minimum.

The duration of the power supplied is also chosen to provide just enough drive to operate the circuit under conditions of low supply voltage and full load. Thus, the resonant tank is supplied only as much energy per cycle as it needs to sustain oscillation and supply its load.

Accordingly, the present invention is a quiet ignition source that readily ignites gas or oil. It is has the advantages of being low in cost and operates at a cool temperature, while still maintaining high efficiency.

These and other features and advantages of the invention will become apparent from the following description of the preferred embodiments of the invention.

DESCRIPTION OF THE PREFERRED EMBODIMENT

The present invention is a method and apparatus for providing high frequency power to an oil ignitor transformer by means of a solid state resonant circuit while minimizing the power dissipation in the circuit. High frequency power according to the applicant's method, may be readily accomplished with an apparatus which is simple, involves minimum circuitry and is inexpensive to implement.

In the following detailed description, references are made to the accompanying drawings, which illustrate specific embodiments in which the invention may be practiced. These embodiments are described in sufficient detail to enable those skilled in the art to practice and use the invention, and it is to be understood that other embodiments may be utilized and that electrical, mechanical, logical and structural changes may be made without departing from the spirit and scope of the present invention. The following detailed description is not to be taken in a limiting sense and the scope of the present invention is defined by the appended claims and their equivalents.

Figure 1:
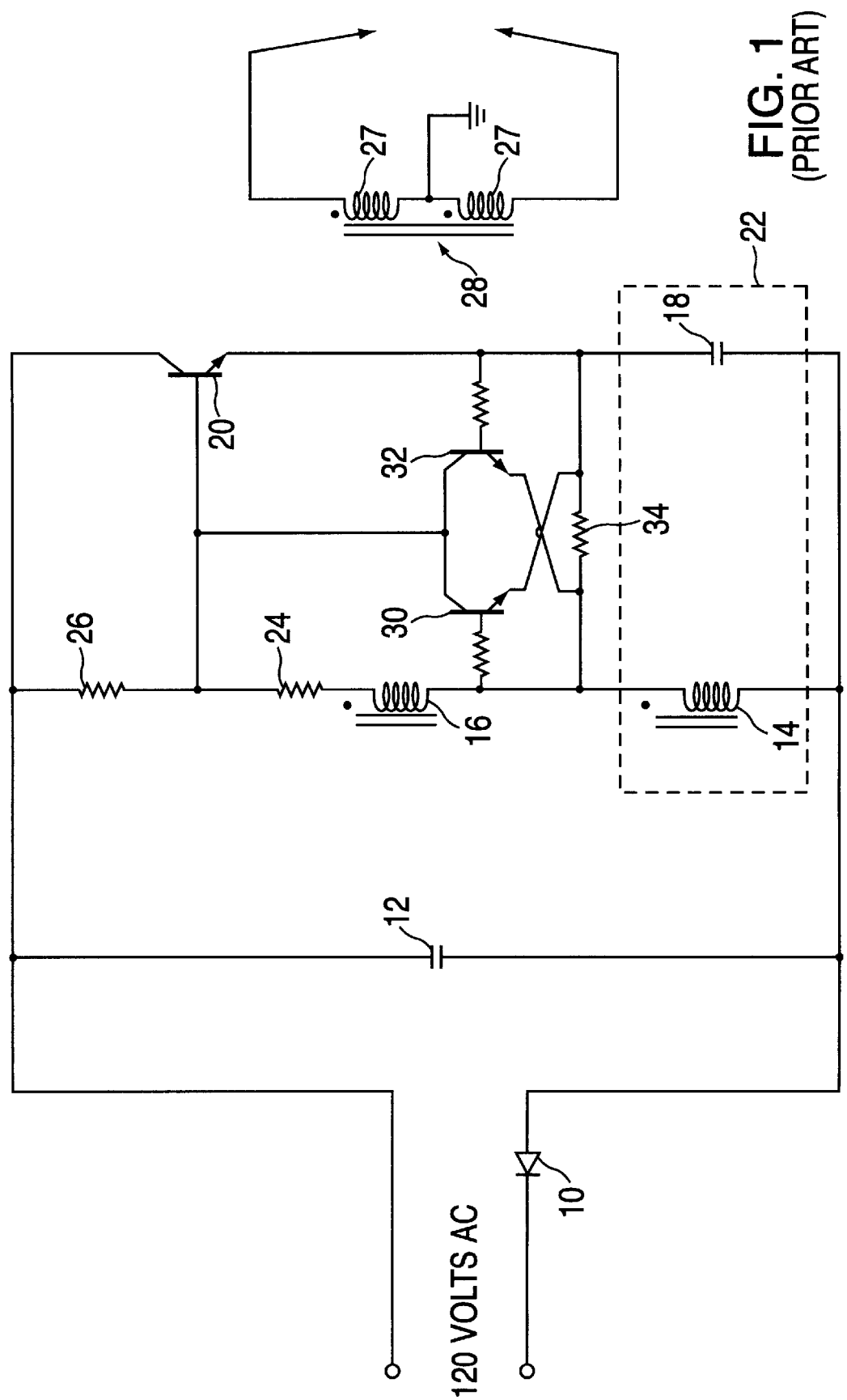
FIG. 1 is a schematic diagram of a common high frequency ignitor of the prior art.

Referring now to FIG. 1, there is shown an oil ignitor circuit commonly available in the prior art. The circuit comprises a source of alternating current, a resonant tank 22, a transformer 28 comprising primary winding 14 and secondary windings 27, and a switching transistor 20.

In a circuit of this type, line voltage from a commonly available AC wall outlet is half-wave rectified by diode 10 and may then be slightly filtered by capacitor 12. A parallel resonant tank circuit 22, composed of the inductance from one transformer primary winding 14 and capacitor 18, resonates at approximately 30 kilohertz.

When transistor 20 begins to conduct, the inductance at transformer winding 14 is magnetically coupled to transformer winding 16 such that as a voltage appears across transformer winding 14, an in-phase voltage appears across transformer winding 16. This results in more current fed into the base of transistor 20, so the process is regenerative. Thus, a power oscillator is realized, comprised of a resonant tank 22, feedback transformer winding 16, transistor 20, and resistors 24 and 26.

Secondary transformer windings 27 are generally wound with a larger number of turns than primary windings 14 and 16. A high voltage is thereby obtained from transformer windings 27 since windings 27 are magnetically coupled to transformer windings 14 and 16.

Although the above described power oscillator will operate and produce a high voltage at the output from secondary windings 27, the circuit will operate quite inefficiently. Significant amounts of heat will be generated and need to be removed from transistor 20 to prevent it from overheating and failing or destroying nearby components. As a solution to this inefficiency problem, the circuit further contains a clamping circuit composed of transistors 30 and 32.

Current circulating in the resonant tank circuit 22 will cause a sinusoidal voltage to appear across resistor 34, wherein the voltage will be in phase with the resonant circulating current and in quadrature with the voltage on capacitor 18. Transistors 30 and 32 are disposed in such a way that whenever the voltage on resistor 34 exceeds about 0.6 volts, either transistor 30 or 32 will begin to conduct, thus shunting the current away from the base of transistor 20. This increases the efficiency of the circuit slightly, by allowing transistor 20 to conduct when the voltage on capacitor 18 is near a maximum. Although this improvement allows transistor 20 to run much cooler and more efficiently, it will still dissipate large amounts of power, enough such that a heatsink must be included to achieve output powers demanded by devices such as oil or gas ignitors and neon sign transformers.

Figure 2:
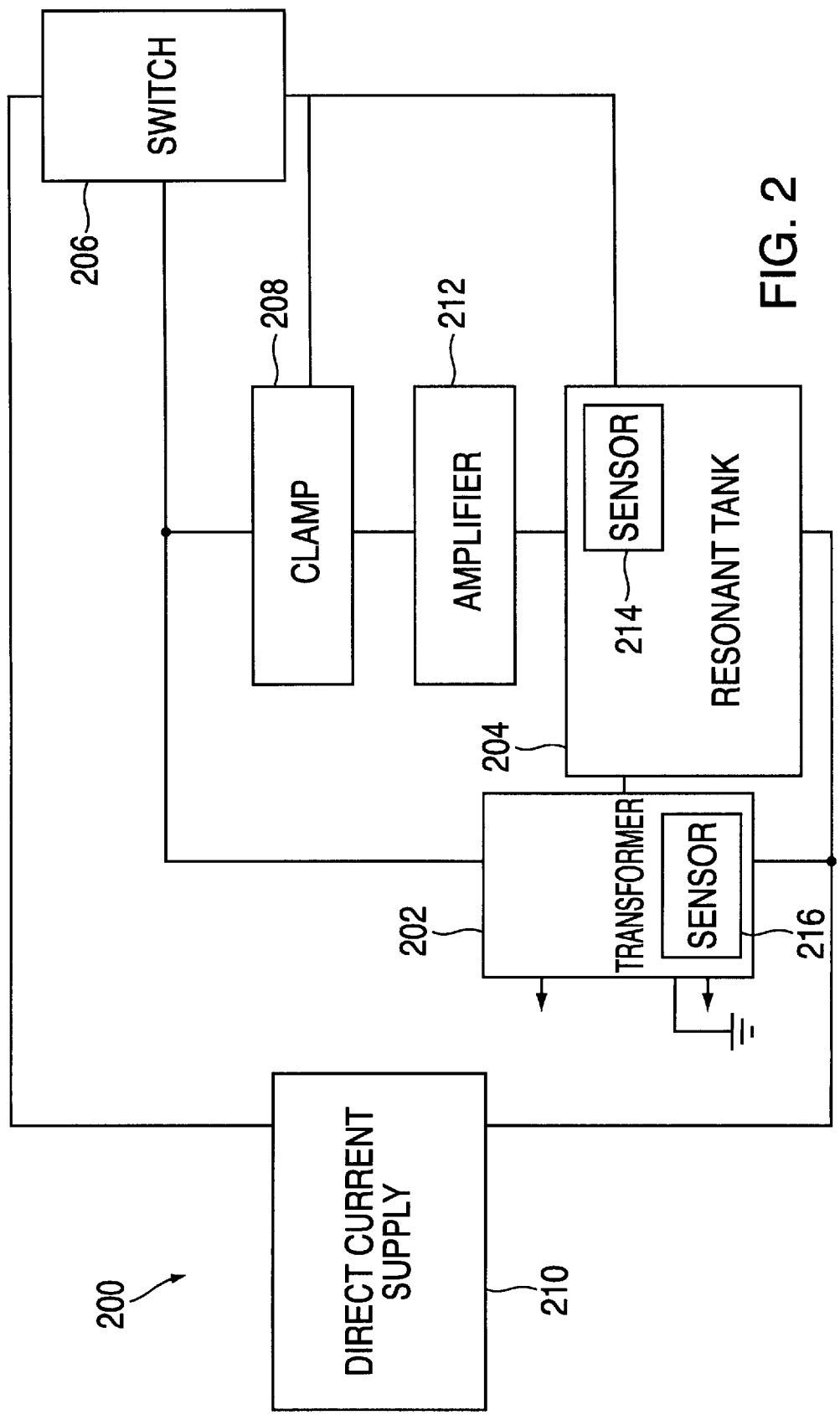
FIG. 2 is a block diagram of a high frequency ignitor in accordance with the present invention.

In order to increase the efficiency and operation of prior art oil ignition circuits and to minimize power dissipation, an improved efficiency circuit 200 for generating high voltage to ignite oil or gas or operate neon tubes has been invented. As shown in FIG. 2, this improved circuit 200 utilizes a source of direct current 210 and is comprised of a switch 206, resonant tank 204, amplifier 212, electrical clamp 208, and transformer 202.

In the preferred embodiment, one output of the direct current supply 210 supplies power to the resonant tank 204 containing a sensor 214, and transformer 202 containing sensor 216. The second output from direct current supply 210 is coupled to switch 206.

Figure 3:
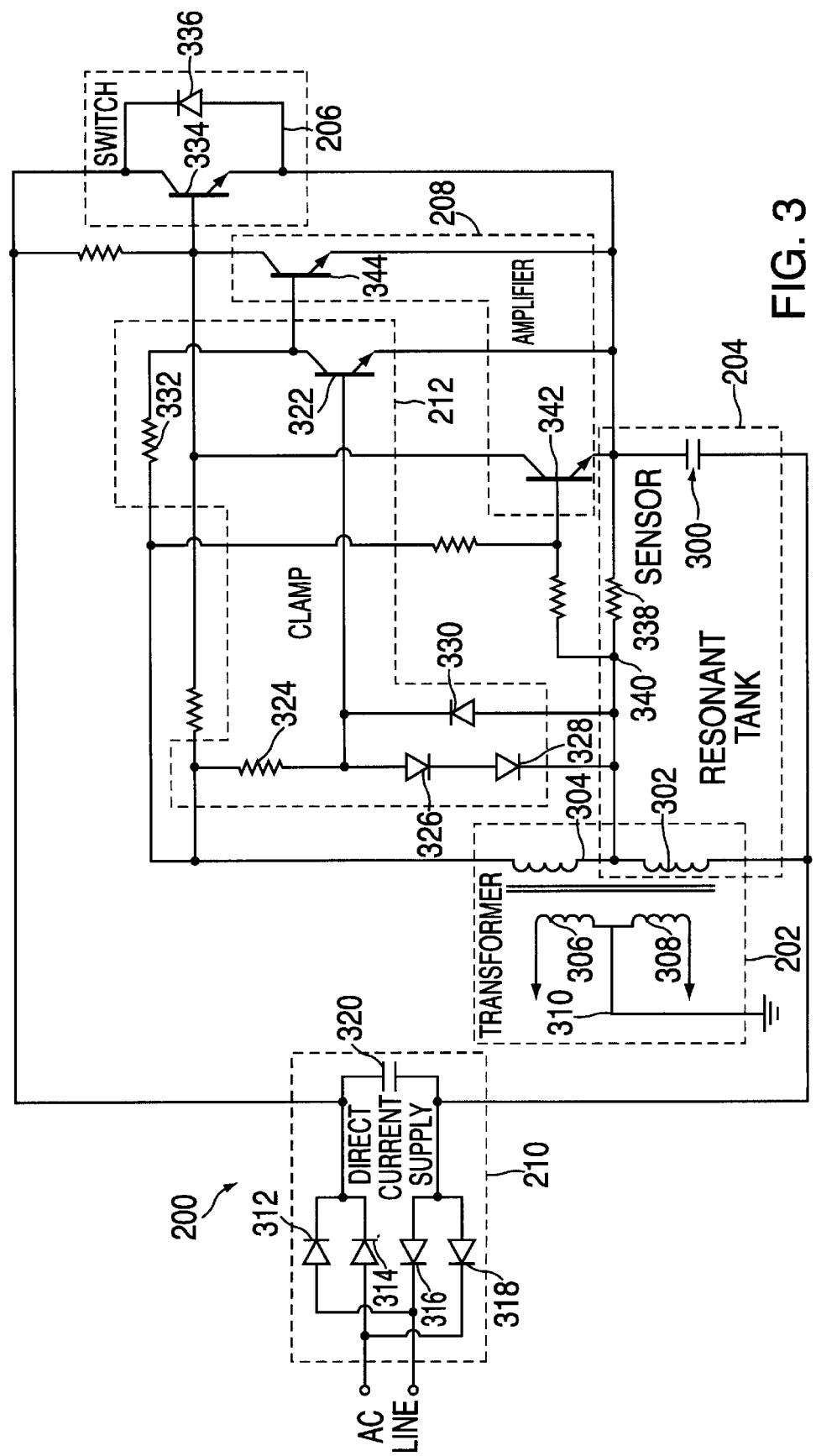
FIG. 3 is a schematic diagram of a preferred circuit for implementing the applicant's invention.

Switch 206 is electrically connected to the resonant tank 204 for providing power to drive the resonant tank 204 at a predetermined frequency. The predetermined frequency may be chosen by adjusting the inductance from primary winding 302 or capacitor 300 in resonant tank 204 as shown in FIG. 3. A typical value for the resonant frequency is in the region between 10 kHz and 100 kHz.

In order to provide maximum energy to the load on transformer 202 while minimizing the power dissipation in switch 206, it is desired to have the drive pulse to the resonant tank 204 occur at the time when the sinusoidal resonant tank voltage is at or near a minimum value. This timing may be accomplished by amplifying a sine-wave replica of the tank current waveform from sensor 338 with an amplifier circuit identified by reference numeral 212, and using that amplified signal to operate the electrical clamp 208 which turns on and off the switch to begin and end the conduction period each cycle. The amplification of the tank current provides a sharp turnoff in switch 206 such that the switch does not linger in a high dissipation condition. Thus, although the invention is a sinusoidal power oscillator, it can realize the efficiency and coolness of operation usually associated only with square-wave switching circuitry.

Looking now to the preferred embodiment, a direct current supply 210 of FIG. 2 may be comprised of an alternating current output from a commonly available commercial alternate current power supply and four diodes 312–318 in a typical bridge arrangement; which are used to rectify the alternating current. In an alternative embodiment, power may be supplied directly to the circuit through a direct current power supply (not shown), eliminating the need for rectifying diodes 312–318. Capacitor 320, which is connected in parallel with the outputs of the bridge arrangement, is used to filter extraneous radio frequency interference. Capacitor 320 may also serve to reduce any ripple present in the output from the direct current supply 210. While full wave rectification is depicted in FIG. 2, half-wave rectification is also contemplated and could be employed.

The resonant tank 204, as shown in FIG. 3, is ideally composed of capacitor 300 and inductor 302, the later of which also comprises the primary winding of transformer 202 in FIG. 2. Transformer 202 is a high frequency transformer having two primary windings 302 and 304, and two secondary windings 306 and 308 which are connected in series, with a center tap 310 tied to ground or circuit common. Because oil ignitor transformers and gas discharge transformers, by design and necessity, have highly reactive output impedances, the current in the primary windings 306 and 308 of transformer 202 is very nearly in quadrature with the voltage. In alternative embodiments, transformer 202 may have a single primary winding with a center tap, or a single secondary winding with one end tied to ground or circuit common.

Switch 206 is ideally comprised of an NPN transistor 334 and diode 336, although various other transistors may be used and are contemplated by the Applicant's invention. As the base of transistor 334 is saturated, power is supplied from the emitter into the resonant tank 204, which causes capacitor 300 and primary winding 302 to resonate. Diode 336 is included to provide a reverse current path should the resonant tank 204 swing the collector voltage negative relative to the emitter of transistor 334. If a metal oxide semiconductor field effect transistor (MOSFET) is used in place of transistor 334, diode 336 may not be necessary. The abrupt switching of transistor 334 serves to minimize the power dissipation and heat generated in the circuit.

Also included in resonant tank 204 is a sensor, shown as element 214 in FIG. 2, and as resistor 338 in FIG. 3. Although a resistor is shown in the preferred embodiment, numerous other methods of sensing the current or voltage in the resonant tank 204 may be employed within the scope of the Applicant's invention. Resistor 338 operates as a current sensor in that the voltage across resistor 338 is proportional to the current passing through it.

Amplifier 212 is ideally comprised of transistor 322 in conjunction with resistor 324, diodes 326, 328, 330, and resistor 332. When the voltage on primary winding 304 is positive, this voltage is used by resistor 324 and diodes 326 and 328 to hold the base of transistor 322 two "diode drops" or approximately 1.2 volts from the average voltage at point 340. The voltage is then added to the voltage across resistor 338, which is the voltage replica of the resonant tank 204 current waveform. Transistor 322 will then be conducting until the voltage at point 340, relative to the emitter of transistor 342, goes slightly negative, which occurs shortly after the resonant tank 204 current reverses and begins flowing from right to left through resistor 338 as shown in FIG. 3. When this situation occurs, transistor 322 will leave its state of conduction.

When transistor 322 is in a state of conduction, the base of transistor 344 is clamped to its emitter and transistor 344 will not be in a state of conduction. When transistor 322 leaves a state of conduction, it serves as an amplifier of the voltage across current sense resistor 338, having a gain comparable to the ratio of resistors 332 and 338. Therefore, although there is a sinusoidal waveform at this point, its rate-of-rise is hundreds of times faster than the rate-of-rise of the voltage on resistor 338, which was formerly used to operate transistor 30 in the prior-art circuit of FIG. 1. Thus, transistor 344 is abruptly switched to an on state, and then abruptly clamps the base of transistor 334 to its emitter and causes the cessation of conduction in transistor 342.

In a similar fashion, transistors 342 and 344 comprise the electrical clamp of FIG. 2 and operate to control the conduction time of switching transistor 334. When either transistor 342 or 344 is in a state of conduction, the base of switching transistor 334 is clamped to its emitter and this effectively terminates the drive pulse to resonant tank 204.

It should be noted that other means of biasing transistor 342 may be employed other than the use of diodes 326, 328, and 330. The operating principle is to bias the base of transistor 342 relative to point 340 such that transistor 342 is released from conduction at the desired time in the cycle. Depending on the value of resistor 338 and the circulating tank current level, such biasing may be accomplished with alternative circuitry comprised of Zener diodes, voltage references, resistors, and the like.

Figure 4:
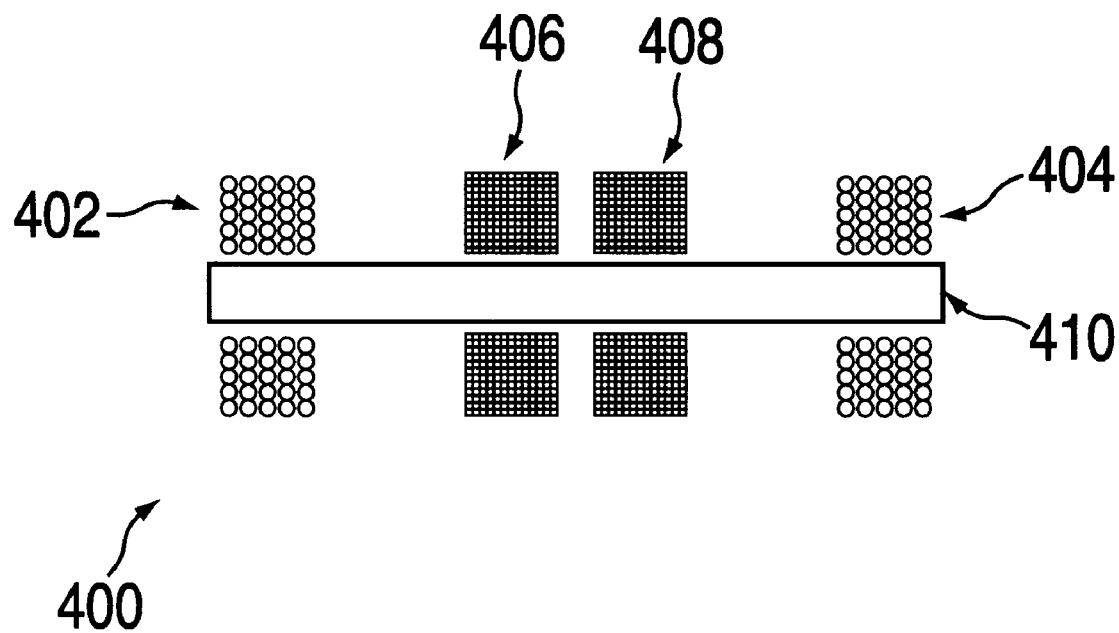
FIG. 4 is a representation of a high voltage transformer which may be used in implementing the Applicant's invention.
Figure 5A:
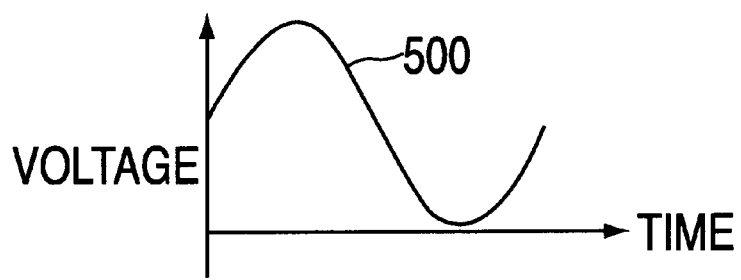
FIG. 5 is a representation of operating waveforms that occur at selected points in the circuit of FIG. 2.
Figure 5B:
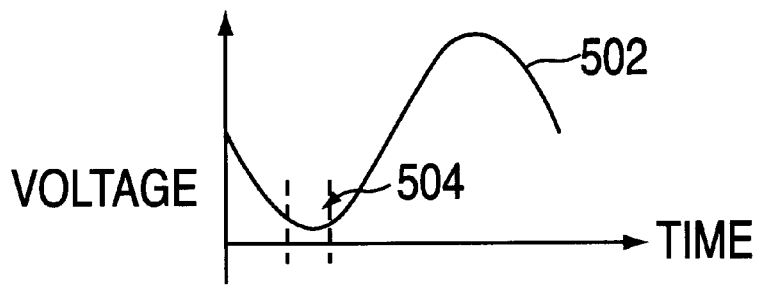
Figure 5C:
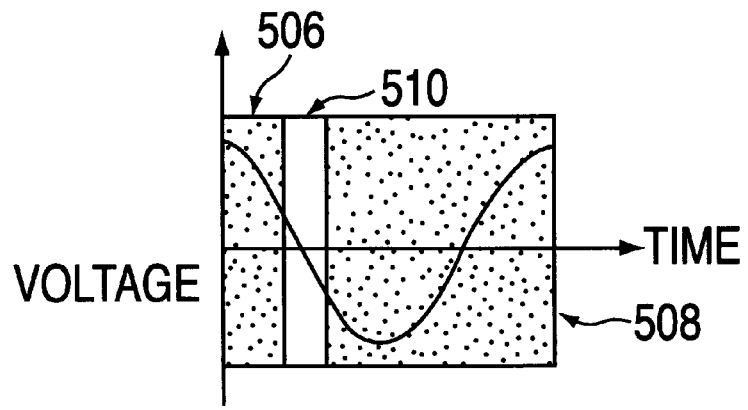
Figure 5D:
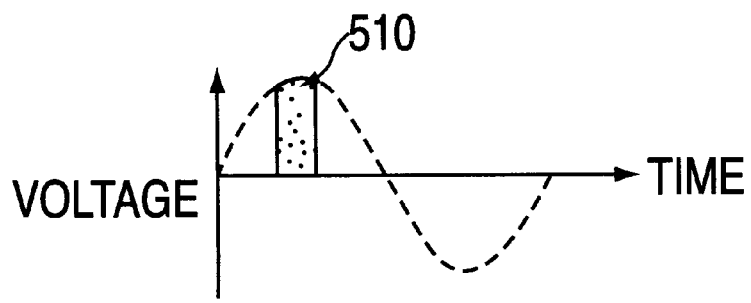

In accordance with this invention, a transformer 400, which may be implemented with the circuit shown in FIG. 2, is depicted in FIG. 4. Since oil ignition or neon-ballast transformers typically require a high output impedance and consequently current limited performance, a transformer is shown with loose coupling from primary to secondary windings while maintaining tight coupling between secondary windings. Tight coupling is provided between the secondary windings 406 and 408 from their close proximity to one another, and to their central location on the ferrite core 410. The two primary windings 402 and 404, with equal numbers of windings, may be connected in series and polarized such that they induce flux in the same direction in the core. From symmetry, the effect of primary 402 on secondary 408 is the same as the effect of primary 404 on secondary 406. This symmetry of operation ensures that the two secondaries are stimulated equally by the current flowing in the composite primary winding comprised of primary 402 and 404 connected in series in flux aiding polarity.

As illustrated in FIG. 5, the output waveform 500 shown in graph A represents the sinusoidal voltage across capacitor 320 of FIG. 3. Since it is an object of the present invention to constrain the conduction time of transistor 334 of FIG. 3 to periods having a small time region around the minima of the resonant tank voltage waveform, the conduction time 504 for transistor 334 thus occurs when the voltage from collector to emitter 502 of transistor 334 is near or at a minimum value as shown by graph B. The conduction time must be chosen to be as narrow as possible and still provide enough energy each cycle to keep the resonant tank 204 of FIG. 3 swinging very close to circuit common. Graph C, showing the voltage across the current sensing resistor 338 thus shows the operation periods, 506 and 508, of clamping transistors 342 and 344 of FIG. 3. Switching transistor 334 is conducting during period 510. Finally, the circuit shown in FIG. 3 operates to provide a base drive voltage waveform for switching transistor 334 as shown in graph D of FIG. 5. Once again, the conduction period for switching transistor 334 is thus shown by period 510.

Although particular embodiments of a high frequency circuit to supply power to oil ignitor and neon sign transformers is shown and described for illustrative purposes, variations of the method as well as variations in the apparatus for carrying out the method will be apparent to those of ordinary skill in the relevant arts. It is not intended that the scope of coverage be limited to the illustrated embodiments, but only by the terms of the following claims.

The embodiments of the invention in which an exclusive property or right is claimed are defined as follows:

1. A high frequency power supply comprising:
   a transformer having at least a primary and secondary winding;
   a switch for selectively supplying power from a power source;
   a resonant tank having an inductive portion for forming a resonance signal, said resonant tank coupled to said switch;
   a sensor for sensing a waveform in said resonant tank;
   an amplifier operatively connected to the sensor for amplifying the waveform; and
   a clamp coupled between said amplifier and said switch for diverting power from said switch based upon the amplified waveform from said amplifier.

2. The high frequency power supply of claim 1 wherein a primary winding of said transformer comprises the inductive portion of said resonant tank.

3. The power source of claim 1 wherein said power source comprises:
   an alternate current power supply for providing alternating current,
   rectification means coupled to said alternate current power supply for receiving alternating current and converting it to direct current.

4. The switch of claim 1 further comprising:
   a transistor having a base, collector, and emitter, the emitter coupled to said resonant tank, the collector coupled to the power source, and the base coupled to said clamp.

5. The switch of claim 4 wherein said transistor comprises a metal oxide semiconductor field effect transistor.

6. The transformer of claim 1 having a ferromagnetic core further comprising:
   at least two primary windings disposed about the circumference of the ferromagnetic core;
   at least two secondary windings disposed about the circumference of the ferromagnetic core, said secondary windings disposed between said primary windings in an inductively coupled relationship;
   wherein said primary and secondary windings are all laterally displaced along the ferromagnetic core.

7. The high frequency power supply of claim 1 wherein the supply of power from the switch is coupled to a waveform in the resonant tank such that the switch is caused to provide power to the resonant tank at or near the zero-crossing of the waveform as sensed by the sensor.

8. The high frequency power supply of claim 2 wherein said sensor further comprises:
   a resistor coupled to the primary winding of said transformer for indicating the phase information of the current in said resonant tank to said amplifier.

9. A method of providing high frequency power to a transformer comprising the steps of:
   A. Providing power to a resonant tank circuit for generating high frequency resonance;
   B. Obtaining the phase information of a waveform from the resonant tank wherein said waveform is representative of the current in the resonant tank;
   C. Amplifying the phase information from the waveform in the resonant tank;
   D. Activating a switch when the amplified waveform reaches a predetermined position said switch being activated when the current flowing in the resonant tank is at or near zero;
   E. Providing power to the resonant tank when the switch is activated; and
   F. Providing power to a transformer from the resonant tank.

10. The method of providing high frequency power to a transformer as stated in claim 9 including the step of;
    Rapidly deactivating the switch when the amplified waveform reaches a second predetermined position.

11. The method of providing high frequency power to a transformer as stated in claim 9 including the step of;
    Reducing the power provided to the resonant tank to a voltage level necessary only to sustain fill voltage oscillation in said resonant tank.

12. A high frequency power supply, comprising:
    a current source having a first and second output,
    a transformer having at least two primary and one secondary windings;
    a resonance capacitive means, coupled to at least one primary winding of said transformer for causing resonance with said primary windings, further coupled to said current source;
    a sensor coupled to said resonance capacitve means for supplying a waveform indicative of the resonance in said resonance capacitive means;
    an amplifier coupled to said sensor operable to amplify the waveform;
    a switch operable to supply power from said current source to said resonance capacitive means; and
    a clamp coupled to said amplifier, said switch, and said resonance capacitive means, said clamp operable to rapidly activate or deactivate said switch.

13. An improved high frequency power supply circuit of the parallel-resonant sinusoidal power oscillator type in which a switching transistor is used to supply power to a resonant tank circuit for providing high frequency power to a transformer, wherein the improvement comprises:
    means for sensing a sinusoidal waveform resonating in the resonant tank circuit;
    an amplifier operable to amplify the sinusoidal waveform in the resonant tank circuit; and
    a clamp operable to rapidly supply to or remove power from the transistor based upon a predetermined position of the amplified sinusoidal waveform from the resonant tank circuit.

14. The resonant tank of claim 1 wherein said resonant tank resonates at a frequency between 10 kHz and 100 kHz.

15. The high frequency power supply of claim 1 wherein said waveform is a current waveform.

* * * * *